(12) United States Patent
Sato

(10) Patent No.: US 6,285,792 B1
(45) Date of Patent: *Sep. 4, 2001

(54) IMAGE RETRIEVAL DEVICE FOR OPTICALLY RETRIEVING AN IMAGE AND OBTAINING BINARY IMAGE DATA FROM THE IMAGE

(75) Inventor: Tatsuya Sato, Ichinomiya (JP)

(73) Assignee: Brother Kabushiki Kaisha, Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/831,429

(22) Filed: Apr. 1, 1997

(30) Foreign Application Priority Data

Apr. 8, 1996 (JP) ................................. 8-085064

(51) Int. Cl.[7] ............................................. G06K 9/36
(52) U.S. Cl. ......................... 382/237; 382/298; 358/451
(58) Field of Search ................................. 382/299, 237, 382/298, 300; 395/102; 358/451, 452, 456, 468, 445, 400, 528, 434, 426, 459, 296, 537, 448, 461, 1.2, 1.9; 345/432, 428, 127, 129; 348/426, 441

(56) References Cited

U.S. PATENT DOCUMENTS

| | | | |
|---|---|---|---|
| 4,947,267 | * 8/1990 | Masaki et al. | 358/426 |
| 5,041,915 | * 8/1991 | Hiroto et al. | 358/400 |
| 5,444,832 | * 8/1995 | Suzuki | 345/432 |
| 5,452,107 | * 9/1995 | Koike | 358/468 |
| 5,553,201 | * 9/1996 | Muramatsu | 358/1.9 |
| 5,585,856 | * 12/1996 | Nakaya et al. | 348/441 |
| 5,604,597 | * 2/1997 | Imai | 358/296 |
| 5,732,196 | * 3/1998 | Watanabe | 358/1.2 |
| 5,805,304 | * 9/1998 | Sekine | 358/448 |

* cited by examiner

Primary Examiner—Leo Boudreau
Assistant Examiner—Ishrat Sherali
(74) Attorney, Agent, or Firm—Oliff & Berridge, PLC

(57) ABSTRACT

An image retrieval device including: an image retrieval unit for optically retrieving an image and outputting an analog image signal according to the image; an analog-to-digital conversion unit for converting the image signal from the image retrieval unit into multi-valued data for a number of pixels representing the image; and a pixel number conversion unit for reducing the number of pixels in the multi-valued data from the analog-to-digital converter by combining multi-valued data for predetermined pluralities of the number of pixels into multi-valued data for single pixels.

25 Claims, 3 Drawing Sheets

IMAGE RETRIEVAL DEVICE FOR OPTICALLY RETRIEVING AN IMAGE AND OBTAINING BINARY IMAGE DATA FROM THE IMAGE

BACKGROUND OF THE INVENTION

1. Field of the Invention

The present invention relates to an image retrieval device for optically retrieving an image and obtaining binary image data of the image.

2. Description of the Related Art

An image scanners using a charge couple device (CCD) sensor or a contact type image sensor are examples of image retrieval devices for obtaining binary data or multi-valued digital image data by optically retrieving an image. Recently, to answer demands for ever increasingly higher resolution, a 12 dot/mm or 16 dot/mm resolution image scanner has been developed.

However, the resolution of retrieval portions used in facsimile machines is set based on a transmission standard of 8 dot/mm. In the United States, the relative standard is defined by the Federal Communications Commission (FCC) Part 68, RS-470. In Japan, the relative standard is defined by the International Telegraph and Telephone Consultative Committee (CCITT). Therefore, when a high resolution image scanner is used as an image retrieval portion of a facsimile machine, there is a need to reduce the number of pixels representing the image. However, it is very difficult to reduce the number of pixels while the image is still in its optical form.

Therefore, in conventional image retrieval devices, pixels of the analog image signal are first converted into binary or multi-valued digital image data. Then, the image pixels are thinned at a predetermined rate to change the total number of the pixels. For example, when an image is retrieved at a resolution of 12 dot/mm, then by thinning the number of pixels down to two thirds of the original total retrieved, the image can be converted into the reduced resolution of 8 dot/mm. Similarly, when the image is retrieved at a resolution of 16 dot/mm, then by reducing thinning the number of pixels down to half the original total retrieved, then the required resolution of 8 dot/mm can be obtained.

SUMMARY OF THE INVENTION

In the above-described conventional image retrieval device, a great deal of information is lost because the number of pixels is reduced by thinning pixels. For example, when an image signal of an original image retrieved at the resolution of 16 dot/mm is converted to obtain binary image data, wherein each pixel is represented by a binary value, then one out of every two pixels is thinned to obtain the resolution of 8 dot/mm. Because only half the original pixels remain, the resultant data representing the image will contain information on only half the original image, that is, as if only half the image was retrieved. Because such a great deal of information on the original image is lost, the quality of the printed image will be poor. When the image data is converted into binary data and processed using dithering processes, then moirécan be generated in the resultant image.

It is an objective of the present invention to overcome the above-described problems and to provide an image retrieval device capable of reducing the amount of image information lost when the number of pixels is converted.

In order to achieve the above-described objectives, an image retrieval device according to the present invention includes: an image retrieval unit for optically retrieving an image and outputting an analog image signal according to the image; an analog-to-digital conversion unit for converting the image signal from the image retrieval unit into multi-valued data for a number of pixels representing the image; and a pixel number conversion unit for reducing the number of pixels in the multi-valued data from the analog-to-digital converter by combining multi-valued data for predetermined pluralities of the number of pixels into multi-valued data for single pixels.

With this configuration, the image data is converted into binary data after the number of pixels is reduced by combining certain pluralities of pixels of multi-valued data into single pixels of multi-valued data. As a result, less information on the original image is lost when converting the number of pixels. Accordingly, degradation in quality of printed images, caused by conversion of the number of pixels, can be reduced.

Explained in more detail, the analog-to-digital converter converts the analog signal into multi-valued digital data. Each set of the multi-valued digital data has two or more bits. When the number of pixels in one single line is to be reduced to two thirds the original number, then the pixel number conversion unit treats each set of three consecutive pixels as one group. Of the three pixels, the pixel number conversion unit combines two adjacent pixels, serving as a predetermined plurality in this case, into a single pixel. As a result, three pixels are converted into two pixels. This process is repeated in each group of three pixels.

On the other hand, when every two pixels are to be combined into a single pixel, then a pixel number conversion unit calculates the average value of the multi-valued data for each set of two pixels. When the pixel number conversion unit obtains a single pixel's worth of multi-valued data by calculating the average value of more than one pixel's worth multi-valued data, then the number of pixels can be converted using a simple calculation that will not result in loss of information from the original image.

Combination of two pixels into a single pixel can be achieved by calculations other than averaging. For example, a calculation method can be use wherein the average value of one set of pixels can have an effect on the multi-valued data for surrounding pixels. The image retrieval unit can be a CCD sensor, a contact type image sensor, or some other commonly used device. A variety of analog-to-digital converters are also available.

According to another aspect of the present invention, a binarization unit is provided for converting multi-valued data from the pixel number conversion unit into binary image data for each pixel. In this case, the image data can be converted into binary data, which is commonly used in image devices. Furthermore, moiré, caused by loss of information when image data is processed by dithering processes, can be prevented.

According to another aspect of the present invention, a selection unit is provided for selectively, that is, according to a selection signal inputted from an external source, outputting one of either the multi-valued data from the analog-to-digital conversion unit or the multi-valued data from the pixel number conversion unit. With this configuration, the resolution of the resultant image data can be optionally selected. Such a function is very convenient when a facsimile machine to which the present invention is applied is used as an image scanner or a copy machine. That is, when the facsimile machine according to the present invention is used as an image scanner or as a copy machine, then the resolution can be set to a high resolution. On the other hand, when the facsimile device is used for transmitting images to a remote facsimile machine, then the resolution can be set to a low resolution. Therefore, the facsimile machine can function as a high quality image scanner or a copy machine and also as a facsimile machine which follows transmission standards.

The selection signal can be generated by a user directly manipulating a key or can be automatically generated when a key is manipulated for selecting a certain operation mode. For example, when the facsimile machine is used as a facsimile machine, the selection signal can be generated by the user manipulating a key for selecting the resolution. Alternatively, the selection signal can be automatically generated when the user manipulates a key for selecting the facsimile transmission function or the copy function of the facsimile machine.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
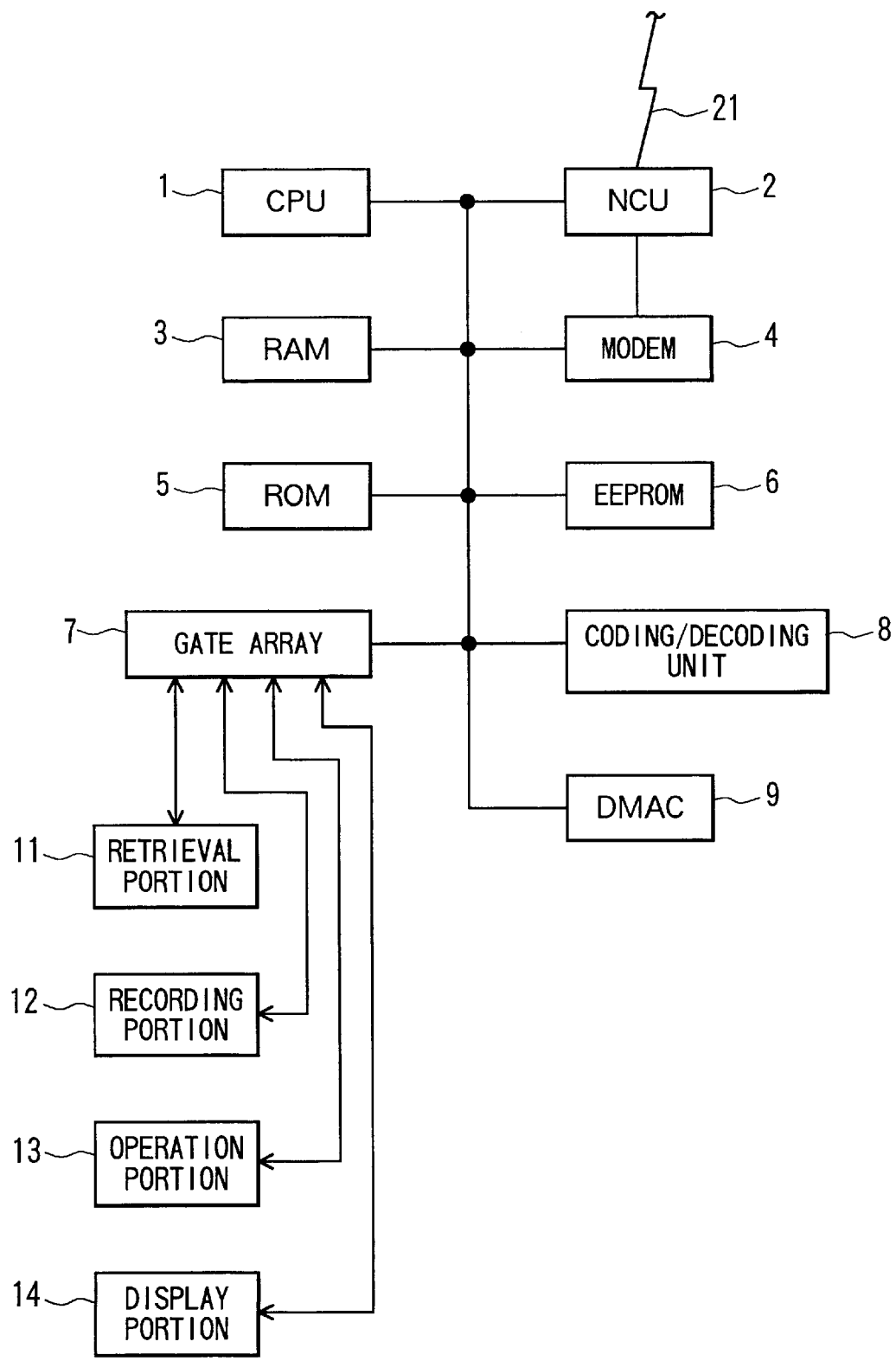
FIG. 1 is a block diagram showing interconnection of electrical circuitry in a facsimile machine having a retrieval device according to an embodiment of the present invention.

An image retrieval device according to a preferred embodiment of the present invention will be described while referring to the accompanying drawings wherein like parts and components are designated by the same reference numerals to avoid duplicating description.

FIG. 1 is a block diagram showing circuitry of a facsimile device including an image retrieval device according to the present invention. As shown in FIG. 1, the facsimile device includes several components connected by a bus line. The bus line could be a data bus, an address bus, or a control signal line and connects together: a CPU 1 for performing overall control of the facsimile machine; an NCU 2 connected to a telephone line 21 and a modem 4 in order to perform network control; a RAM 3 storing a variety of digital data, such as an image information; the modem 4 for perfuming modulation of transmitted data and demodulation of received data; a ROM 5 storing a variety of programs and data; an EEPROM 6 storing a variety of register data or flags; a gate array 7 formed from several logic circuits for digitizing image signals and also functioning as an input/output interface for the CPU 1; a coding/decoding unit 8 for decoding received image data coded by the modem 4 and also for coding transmission image data to be modulated by the modem 4; and a DMAC 9 for controlling memory access to the RAM 3.

The gate array 7 is connected to several units, including: a retrieval portion 11 having a light source, a CCD sensor, and a document feed motor, outputting an analog image signal corresponding to the retrieved image; a recording portion 12 having a laser printer, for example, for recording images onto a recording sheet based on image data; an operation portion 13 formed from a group of key switches for outputting operation signals according to operations desired by the user; and a display portion 14 formed from a liquid crystal (LCD) for displaying a variety of screens as controlled by the CPU 1.

Figure 2:
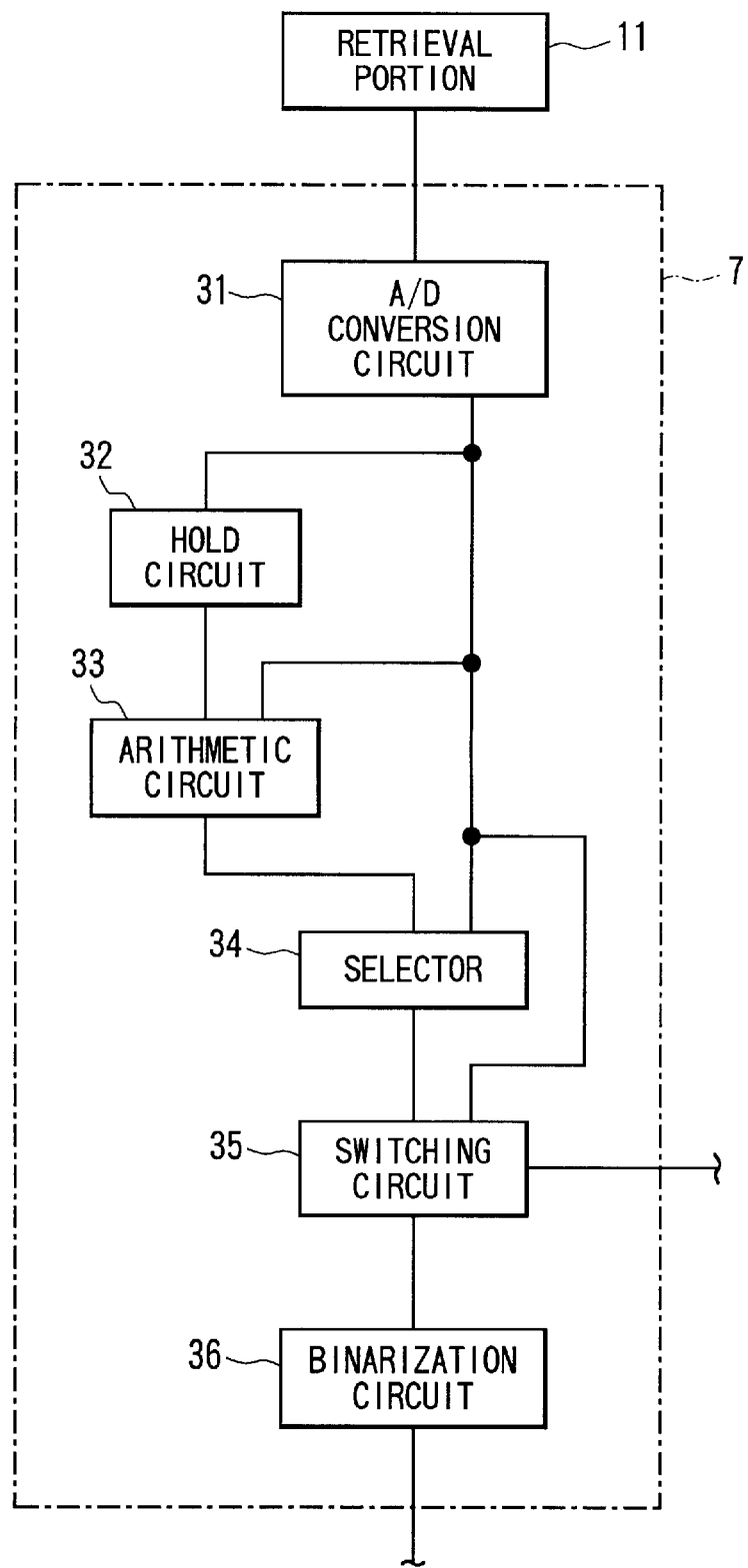
FIG. 2 is a block diagram showing interconnection of electrical circuitry in a gate array of the facsimile machine.

FIG. 2 is a block diagram showing the retrieval portion 11 and circuitry of the gate array 7 of the image retrieval device provided in the facsimile device. The gate array 7 includes: an analog-to-digital conversion circuit 31, a hold circuit 32 such as a single 8 bit register, a arithmetic circuit 33, a selector 34, a switching circuit 35, and a binarization circuit 36. The analog-to-digital conversion circuit 31 could alternatively be provided to the retrieval portion 11.

The following is a description of operations performed by the gate array 7 to reduce the number of pixels of an image retrieved using the retrieval portion 11. The retrieval portion 11 optically retrieves the image from the original document and outputs an analog signal accordingly. The analog-to-digital conversion circuit 31 converts each pixel of the analog signal from the retrieval portion 11 into, for example, 8 bit image data and outputs the image data to the hold circuit 32, the arithmetic circuit 33, and the selector 34. The hold circuit 32 holds one pixel's worth of image data from the analog-to-digital conversion circuit 31 until it receives input of another pixel's worth of image data from the analog-to-digital conversion circuit 31, whereupon the hold circuit 32 outputs the one pixel's worth of the image data to the arithmetic circuit 33.

The arithmetic circuit 33 calculates the average between the image data from the analog-to-digital conversion circuit 31 and the image data from the hold circuit 32. For example, while the hold circuit 32 is holding the first pixel's worth of image data, the analog-to-digital conversion unit 31 will output the second pixel's worth of image data simultaneously to the hold circuit and to the arithmetic circuit 33. As a result, the hold circuit 32 will output the first pixel's worth of image data to the arithmetic circuit 33, which calculates the average of the first and second pixel's worth of image data accordingly. The arithmetic circuit 33 outputs the resultant single pixel's worth of image data to the selector 34. The selector 34, according to predetermined sequences to be described later, selectively outputs to the switching circuit 35 either multi-valued data from the analog-to-digital conversion circuit 31 or multi-valued data from the arithmetic circuit 33. The switching circuit 35 selectively outputs to the binarization circuit 36 either multi-valued data from the analog-to-digital conversion circuit 31 or multi-valued data from the selector 34, that is, based on a selection signal from the CPU 1. The binarization circuit 36 then binarizes the multi-valued data from the switching circuit 35.

Said differently, the analog-to-digital conversion circuit 31 serves to convert the image signal from the retrieval portion 11 into multi-valued data for each pixel. The hold circuit 32, the arithmetic circuit 33, and the selector 34 serve to combine the multi-valued data for each predetermined plurality of pixels into multi-valued data for a single pixel. In this way, the hold circuit 32, the arithmetic circuit 33, and the selector 34 reduce the number of pixels. The switching circuit 35 then selectively, that is, according to a selection signal inputted from an external source, outputs either multi-valued data directly from the analog-to-digital conversion circuit 31 or the multi-valued data from the hold circuit 32 and the arithmetic circuit 33 via the selector 34.

The binarization circuit 36 serves to convert the multi-valued data from the switching circuit 35 into binary data for each pixel.

Next, operations for the facsimile device having the above-described configuration will be provided. First, an explanation will be provided for when a user operates the operation portion 13 to select a high resolution mode, such as a high quality image mode, a copy mode, or an image scanner mode. The CPU 1 outputs a high resolution selection signal to the switching circuit 35 according to the high resolution selection of the user. As a result, the switching circuit 35 will output multi-valued data from the analog-to-digital conversion circuit 31 directly to the binarization circuit 36.

First, the CPU 1 starts operation of the retrieval portion 11 so that the retrieval portion 11 retrieves the image from the original document. The retrieval portion 11 serially outputs an analog image signal representing the image to the analog-to-digital conversion circuit 31. The analog-to-digital conversion circuit 31 converts the image signal from the retrieval portion 11 into 8 bit multi-valued data for each pixel and outputs the resultant multi-valued data to the switching circuit 35. The switching circuit 35 outputs image data from the analog-to-digital conversion circuit 31 to the binarization circuit 36. The binarization circuit 36 converts the multi-valued data from the switching circuit 35 into binary data and outputs the result.

Next, the gate array 7 outputs the binary data from the binarization circuit 35 to a destination that depends on the mode of the facsimile device. For example, when the facsimile device is set to the copy mode, then the gate array 7 transmits the binary data from the binarization circuit 36 to the recording portion 12 so that the image retrieved by the retrieval portion 11 is recorded on a recording sheet. When the facsimile device is set to the image scanner mode, the binary data outputted from the binarization circuit 36 is stored temporarily in the RAM 3 from the DMAC 9. Afterward, the data can either be transmitted to the display portion 14 to display the retrieved image or transmitted to a personal computer connected to the facsimile device, where it can be displayed, printed, or edited in a variety of ways.

In this way, binary data for the number of pixels corresponding to a high resolution of 12 dot/mm, for example, is outputted from the binarization circuit 36 without reducing the number of pixels.

Next, an explanation will be provided for when the user operates the operation panel 13 to select the transmission mode. In this case, the CPU outputs the selection signal to the selection circuit 35 accordingly so that the switching circuit 35 will output multi-valued data from the selector 34 to the binarization circuit 36. First, the CPU 1 starts operation of the retrieval portion 11 so that the retrieval portion 11 retrieves an image from an original document. The retrieval portion 11 serially outputs an analog image signal to the analog-to-digital conversion circuit 31 accordingly. The analog-to-digital conversion circuit 31 converts the image signal from the retrieval portion 11 into, for example, 8 bit multi-valued data for each pixel and outputs the result to the hold circuit 32 and to the arithmetic circuit 33. While the hold circuit 32 holds a second pixel's worth of the multi-valued data, the arithmetic circuit 33 calculates the average value for the second pixel's worth of multi-valued data from the analog-to-digital conversion circuit 31 and a first pixel's worth of multi-valued data from the hold circuit 32. The arithmetic circuit 33 outputs multi-valued data corresponding to the average value to the selector 34. In this way, the arithmetic circuit 33 calculates the average value for the present pixel's worth of multi-valued data outputted from the analog-to-digital conversion circuit 31 and the previous pixel's worth of multi-valued data from the hold circuit 32. The selector 34 outputs selectively, in accordance with a predetermined sequence to be described below, to the switching circuit 35 either multi-valued data from the analog-to-digital conversion circuit 31 or multi-valued data from the arithmetic circuit 33.

Next, two examples will be provided for the predetermined sequences in which the selector 34 selectively outputs multi-valued data. In a first example, it will be assumed that the numbers of pixels needs to be reduced to two thirds the original number. In this case, the selector 34 outputs the first pixel's worth of multi-valued data from the analog-to-digital conversion circuit 31 directly to the switching circuit 35. The hold circuit 32 holds the second pixel's worth of multi-valued image data until the analog-to-digital conversion circuit 31 outputs the third pixel's worth of multi-valued image data, whereupon the second pixel's worth of multi-valued data from the hold circuit 32 is inputted to the arithmetic circuit 33 simultaneously with the third pixel's worth of multi-valued image data directly from the analog-to-digital conversion circuit 31. The selector 34 outputs the resultant multi-valued data calculated by the arithmetic circuit 33 to the switching circuit 35.

Figure 3:
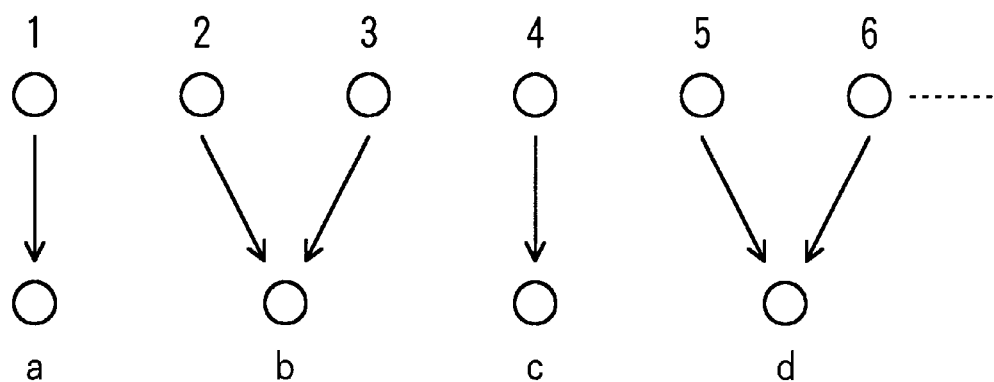
FIG. 3 is a schematic view representing an example of processes performed in the gate array for reducing number of pixels for a retrieved image.

These operations are repeated as illusory shown in FIG. 3. In the example shown in FIG. 3, the first pixel's multi-valued data No. 1 is outputted as is to the switching circuit 35 as multi-valued data No. a. The second pixel's multi-valued data No. 2 and third pixel's multi-valued data No. 3 are averaged and outputted to the switching circuit 35 as multi-valued data No. b. The fourth pixel's multi-valued data No. 4 is outputted directly as is to the switching circuit 35 as multi-valued data No. c. The fifth pixel's multi-valued data No. 5 and the sixth pixel's multi-valued data are averaged and outputted to the switching circuit 35 as multi-valued data No. d. In this way, the number of pixels can be reduced to two thirds of the original number. That is to say, even though the retrieval portion 11 retrieved an image of the original document at a resolution of 12 dot/mm, multi-valued data for a number of pixels corresponding to a resolution of 8 dot/mm are inputted into the switching circuit 35.

Figure 4:
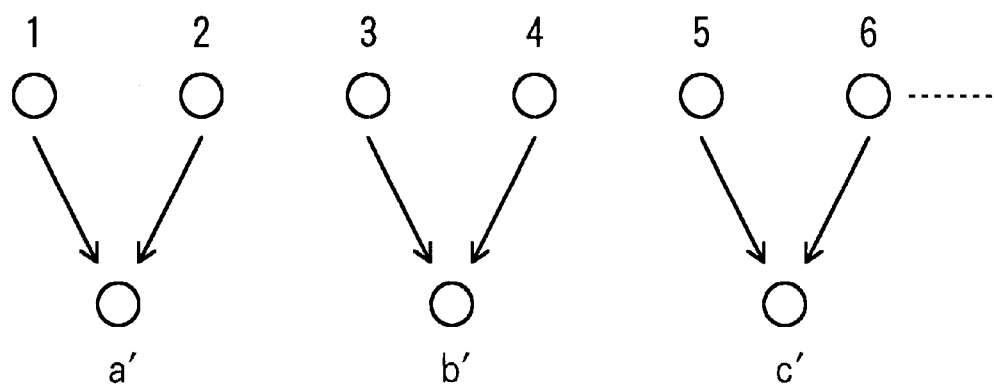
FIG. 4 is another schematic view representing another example of processes performed in the gate array for reducing number of pixels for a retrieved image.

In a second example, it will be assumed that the number of pixels needs to be reduced to half an original number, that is, when the retrieval portion 11 retrieves an image of the original document at a resolution of 16 dot/mm. As shown in FIG. 4, the average of the first pixel's multi-valued data No. 1 and the second pixel's multi-valued data No. 2 is calculated and the result outputted as multi-valued data No. a. The average of the third pixel's multi-valued data No. 3 and the fourth pixel's multi-valued data No. 4 is calculated and outputted as multi-valued data No. b'. The average of the fifth pixel's multi-valued data No. 5 and the sixth pixel's multi-valued data No. 6 is calculated and outputted as multi-valued data No. c'. By repeating this operation, the number of pixels can be reduced to one half the original number. In this case, the selector 34 is unnecessary and output from the arithmetic circuit 33 can be inputted directly to the switching circuit 35.

Multi-value data outputted with reduced number of pixels from the selector 34 is inputted to the binarization circuit 36 via the switching circuit 35. The binarization circuit 36 binarizes each pixel and outputs the result. The resultant binarized data is then coded by the coding/decoding unit 8, modulated by the modem 4, and transmitted across the telephone circuit 21 via the NCU 2.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. An image retrieval device comprising:
    an image retrieval unit for optically retrieving an image and outputting an analog image signal according to the image;
    an analog-to-digital conversion unit for converting the image signal from the image retrieval unit into multi-valued data for a number of pixels representing the image;
    a pixel number conversion unit for reducing the number of pixels in the multi-valued data from the analog-to-digital conversion unit by combining multi-valued data for predetermined pluralities of the number of pixels into multi-valued data for single pixels; and
    a selection unit for receiving input of a selection signal from an external source and selectively outputting, according to the selection signal, at least one of multi-valued data directly from the analog-to-digital conversion unit and multi-valued data from the pixel number conversion unit,
    wherein the pixel number conversion unit includes:
        a hold circuit which receives, from the analog-to-digital conversion unit, multi-valued data for a first member of each of the predetermined pluralities of pixels and holds the multi-valued data for the first member until outputting the multi-valued data for the first member at a predetermined timing;
        a combining circuit which receives, at the predetermined timing, the multi-valued data for the first member from the hold circuit and, from the analog-to digital conversion unit, multi-valued data for a second member of each of the predetermined pluralities of pixels and which combines the multi-valued data for the first member and the multi-valued data for the second member into multi-valued data for a single pixel in each of the predetermined pluralities of pixels.

2. An image retrieval device as claimed in claim 1, further comprising a binarization unit which converts the multi-valued data from the pixel number conversion unit into binary image data representing the image.

3. An image retrieval device as claimed in claim 2, wherein the pixel number conversion unit averages multi-valued data for each of the predetermined pluralities of pixels to compute multi-valued data for corresponding single pixels.

4. An image retrieval device as claimed in claim 1, wherein the pixel number conversion unit averages multi-valued data for each of the predetermined pluralities of pixels to compute multi-valued data for corresponding single pixels.

5. An image retrieval device as claimed in claim 1, wherein the combining circuit includes:
    an arithmetic circuit which receives, at the predetermined timing, the multi-valued data for the first member from the hold circuit and, from the analog-to-digital conversion unit, multi-valued data for the second member of each of the predetermined pluralities of pixels and which computes an average of the multi-valued data for the first member and the multi-valued data for the second member.

6. An image retrieval device as claimed in claim 5, wherein:
    the arithmetic circuit outputs multi-valued data for the average of the multi-valued data for the first member and the multi-valued data for the second member;
    the analog-to-digital conversion unit outputs multi-valued data for a third member of each of the predetermined pluralities of pixels; and
    the pixel number conversion unit further includes a selector which selectively outputs, according to a predetermined sequence, at least one of the multi-valued data outputted from the arithmetic circuit and the multi-valued data for the third member outputted from the analog-to-digital conversion unit.

7. An image retrieval device as claimed in claim 6, wherein the selector of the pixel number conversion unit alternately outputs the multi-valued data outputted from the arithmetic circuit and the multi-valued data for the third member outputted from the analog-to-digital conversion unit.

8. An image retrieval device as claimed in claim 6, wherein the selector selectively outputs according to a predetermined sequence corresponding to a resolution of the image retrieval unit.

9. An image retrieval device as claimed in claim 6, wherein the image retrieval device is used in a facsimile machine and the selector selectively outputs according to a predetermined sequence corresponding to a transmission function of the facsimile machine.

10. An image retrieval device as claimed in claim 5, further comprising a binarization unit which converts the multi-valued data from the pixel number conversion unit into binary image data representing the image.

11. A facsimile machine comprising:
    an image retrieval unit for optically retrieving a single image and outputting an analog image signal according to the image;
    an image retrieval unit for optically retrieving a single image and outputting an analog image signal according to the single image;
    an analog-to-digital conversion unit for converting the image signal from the image retrieval unit into multi-valued data for a number of pixels representing the single image;
    a pixel number conversion unit for reducing the number of pixels in the multi-valued data from the analog-to-digital conversion unit by combining multi-valued data for predetermined pluralities of the number of pixels into multi-valued data for single pixels, wherein the pixel number conversion unit selecting, among the original multi-valued data for all the pixels of the single image, multi-valued data for at least two pixels, while remaining multi-valued data for at least one pixel, combining the selected multi-valued data into multi-valued data for pixels whose number is smaller than the number of the selected pixels, and outputting, for a reduced number of pixels compared to the number of all the pixels originally representing the single image, the resultant, combined multi-valued data together with the remaining, non-selected multi-valued data, thereby selectively combining the multi-valued data from the analog-to-digital conversion unit to produce multi-valued data for the reduced number of pixels compared to the multi-valued data from the analog-to-digital conversion unit;
    a mode setting unit for performing a setting operation to set one of a facsimile transmission mode, an image scanner mode, and a copy mode;

a determining unit for determining which of multi-valued data directly from the analog-to-digital conversion unit and multi-valued data from the pixel number conversion unit should be outputted, depending on the setting operation performed by the mode setting unit; and a selection unit for selectively outputting the determined one of multi-valued data directly from the analog-to-digital conversion unit, and multi-valued data from the pixel number conversion unit, thereby enabling selective output of at least two different resolutions of data based on data from the image retrieval unit, and depending on setting operation performed by the mode setting unit.

12. A facsimile machine as claimed in claim 11, wherein the determining unit includes a controller for controlling the selection unit to output:

multi-valued data directly from the analog-to-digital conversion unit when the mode setting unit performs a setting operation to set one of the image scanner mode and the copy mode; and multi-valued data from the pixel number conversion unit when the mode setting unit performs a setting operation to set the facsimile transmission mode.

13. An image retrieval device as claimed in claim 1, further comprising a selection input unit for receiving input of a selection and for outputting a selection signal indicative of the input selection to the selection unit, and wherein the selection unit selectively outputs one of multi-valued data directly from the analog-to-digital conversion unit and multi-valued data from the pixel number conversion unit according to the selection signal.

14. An image retrieval device as claimed in claim 13, wherein the selection input unit enables a user to select one of multi-valued data directly from the analog-to-digital conversion unit and multi-valued data from the pixel number conversion unit and outputs the selection signal indicative of the user's selection.

15. A facsimile machine as claimed in claim 12, wherein the mode setting unit enables a user to select one of the image scanner mode, the copy mode and the facsimile transmission mode.

16. An image retrieval devices comprising:

an image retrieval unit for optically retrieving a single image and outputting an analog image signal according to the image;

an analog-to-digital conversion unit for converting the image signal from the image retrieval unit into multi-valued data for a number of pixels representing the single image;

a pixel number conversion unit that selects, among multi-valued data for all the pixels of the single image, multi-valued data for at least two pixels, while remaining multi-valued data for at least one pixel, that combines the selected multi-valued data into multi-valued data for pixels whose number is smaller than the number of the selected pixels, and that outputs, for a reduced number of pixels compared to the number of all the pixels originally representing the single image, the resultant, combined multi-valued data together with the remaining, non-selected multi-valued data, thereby selectively combining the multi-valued data from the analog-to-digital conversion unit to produce multi-valued data for the reduced number of pixels compared to the multi-valued data from the analog-to-digital conversion unit.

17. A facsimile machine as claimed in claim 11, wherein the pixel number conversion unit includes:

a hold circuit which receives, from the analog-to-digital conversion unit, multi-valued data for a first member of each of the predetermined pluralities of pixels and holds the multi-valued data for the first member until outputting the multi-valued data for the first member at a predetermined timing; and an arithmetic circuit which receives, at the predetermined timing, the multi-valued data for the first member from the hold circuit, and from the analog-to-digital conversion unit, multi-valued data for a second member of each of the predetermined pluralities of pixels and which computes an average of the multi-valued data for the first member and the multi-valued data for the second member.

18. An image retrieval device as claimed in claim 16, wherein the pixel number conversion unit includes:

a hold circuit which receives, from the analog-to-digital conversion unit, multi-valued data for a first member of each of the predetermined pluralities of pixels and holds the multi-valued data for the first member until outputting the multi-valued data for the first member at a predetermined timing;

an arithmetic circuit which receives, at the predetermined timing, the multi-valued data for the first member from the hold circuit and, from the analog-to-digital conversion unit, multi-valued data for a second member of each of the predetermined pluralities of pixels and which computes an average of the multi-valued data for the first member and the multi-valued data for the second member, the arithmetic circuit outputting multi-valued data for the average of the multi-valued data for the first member and the multi-valued data for the second member, the analog-to-digital conversion unit outputting multi-valued data for a third member of each of the predetermined pluralities of pixels; and a selector which selectively outputs, according to a predetermined sequence, at least one of the multi-valued data outputted from the arithmetic circuit and the multi-valued data for the third member outputted from the analog-to-digital conversion unit.

19. An image retrieval device as claimed in claim 18, wherein the selector of the pixel number conversion unit alternately outputs the multi-valued data outputted from the arithmetic circuit and the multi-valued data for the third member outputted from the analog-to-digital conversion unit.

20. An image retrieval device as claimed in claim 18, wherein the selector selectively outputs according to a predetermined sequence corresponding to a resolution of the image retrieval unit.

21. An image retrieval device as claimed in claim 16, further comprising:

a mode setting unit for performing a mode-setting operation to set at least one predetermined mode; and a determining unit that determines whether multi-valued data from the pixel number conversion unit should be outputted, dependently on the mode-setting operation, wherein the pixel number conversion unit includes;

a combining unit that combines the selected multi-valued data for some pixels, among all the pixels of the single image, into multi-valued data for pixels whose number is smaller than the number of the selected pixels; and a selecting unit that alternately outputs the multi-valued data combined by the combining unit and the multi-valued data for non-selected remaining pixels that is outputted from the analog-to-digital conversion unit.

22. An image retrieval device as claimed in claim 21, wherein the at least one predetermined mode includes a facsimile mode.

23. An image retrieval method, comprising the steps of:

optically retrieving an image from an image recording medium;

outputting an analog image signal according to the image;

converting the image signal into multi-valued data for a number of pixels representing the image;

reducing the number of pixels in the multi-valued data by combining multi-valued data for predetermined pluralities of the number of pixels into multi-valued data for single pixels; and selectively outputting at least one of multi-valued data which is not combined and multi-valued data which is combined;

wherein said reducing step further comprises the steps of;

receiving a multi-valued data for a first member of each of the predetermined pluralities of pixels;

holding the multi-valued data for the first member until outputting the multi-valued data for the first member at a predetermined timing;

receiving, at the predetermined timing, the multi-valued data for the first member and multi-valued data for a second member of each of the predetermined pluralities of pixels; and combining the multi-valued data for the first member and the multi-valued data for the second member into multi-valued data for a single pixel in each of the predetermined pluralities of pixels.

24. A facsimile method, comprising the steps of:

optically retrieving a single image and outputting an analog image signal according to the image;

converting the image signal into multi-valued data for a number of pixels representing the single image;

reducing the number of pixels in the multi-valued data by combining multi-valued data for predetermined pluralities of the number of pixels into multi-valued data for single pixels, wherein the pixel number reducing step selecting, among the original multi-valued data for all the pixels of the single image, multi-valued data for at least two pixels, while remaining multi-valued data for at least one pixel, combining the selecting multi-valued data into multi-valued data for pixels whose number is smaller than the number of the selected pixels, and outputting, for a reduced number of pixels compared to the number of all the pixels originally representing the single image, the resultant, combined multi-valued data together with the remaining, non-selected multi-valued data, thereby selectively combining the multi-valued data to produce multi-valued data for the reduced number of pixels compared to the original multi-valued data;

performing a mode setting operation to set one of a facsimile transmission mode, an image scanner mode, and a copy mode;

determining which of the original multi-valued data and the combined data should be outputted, depending on the mode setting operation; and selectively outputting the determined one of the original multi-valued data and the combined multi-valued data, thereby enabling selective output of at least two different resolutions of data, and depending on the mode setting operation.

25. An image retrieval method, comprising the steps of:

optically retrieving a single image and outputting an analog image signal according to the image;

converting the image signal into multi-valued data for a number of pixels representing the single image;

selecting, among multi-valued data for all the pixels of the single image, multi-valued data for at least two pixels, while remaining multi-valued data for at least one pixel;

combining the selected multi-valued data into multi-valued data for pixels whose number is smaller than the number of the selected pixels, and outputting, for a reduced number of pixels compared to the number of all the pixels originally representing the single image, the resultant, combined multi-valued data together with the remaining, non-selected multi-valued data, thereby selectively combining the original multi-valued data to produce multi-valued data for the reduced number of pixels compared to the original multi-valued data.

* * * * *